United States Patent [19]

Tyler

[11] 3,753,792

[45] Aug. 21, 1973

[54] METHOD OF ACHIEVING THERMALLY BALANCED HOT WIRE RELAY TYPE DEVICES

[75] Inventor: Hugh Jean Tyler, Santa Ana, Calif.

[73] Assignee: Robertshaw Controls Company, Richmond, Va.

[22] Filed: Dec. 9, 1971

[21] Appl. No.: 206,393

Related U.S. Application Data

[62] Division of Ser. No. 838,501, July 2, 1969, Pat. No. 3,684,994.

[52] U.S. Cl. ................. 148/13, 148/13.1, 148/127, 148/131, 148/133
[51] Int. Cl. ............................................. C22f 1/10
[58] Field of Search.................. 148/13, 13.1, 130, 148/131, 133, 127

[56] References Cited
UNITED STATES PATENTS 3,558,369  1/1971  Wang et al.......................... 148/133
3,285,470  11/1966  Frei et al. .......................... 148/13.1

Primary Examiner—Richard O. Dean
Attorney—Anthony A. O'Brien

[57] ABSTRACT

A hot wire relay type device, formed from an alloy composition exhibiting a characteristic of mechanical shape memory as a result of martensitic-type transformation, is produced for use as a heat reactive controller in such manner that the supported terminal portions do not react to heat or, at the very least, heat above the transition temperature simultaneously with the portion of the device intermediate such terminal portions whereby the wire achieves a thermal balance throughout its entire body.

10 Claims, 7 Drawing Figures

PATENTED AUG 21 1973 3,753,792

INVENTOR
Hugh Jean Tyler

BY Anthony A. O'Brien
ATTORNEY

METHOD OF ACHIEVING THERMALLY BALANCED HOT WIRE RELAY TYPE DEVICES

CROSS REFERENCE TO RELATED APPLICATION

This is a divisional application of copending application Ser. No. 838,501 filed July 2, 1969, now U.S. Pat. No. 3,684,994, issued August 15, 1972.

BACKGROUND OF THE INVENTION

1. Field of the Invention

This invention generally appertains to improvements in temperature responsive devices and, more particularly, relates to new and novel improvements in the methods of achieving thermal balance in hot wire relay type devices for use as thermal reactive controllers for operating or actuating drive, switch or motor devices in response to a supplied heat within a predetermined temperature range.

2. Description of the Prior Art

The provision of hot wires and their use for controlling various devices, such as an electrical switch, drive mechanism, motor mechanism or the like, is well known in the prior art wherein bimetallic filaments, thermally expansible wires and the like are employed for operating control or work mechanisms with the essence of the construction being resident in the fact that the wire changes dimension simply on the basis of having a thermal coefficient of expansion.

Such known devices do not possess good stability and are not extremely and critically reliable in quick and positive temperature reactive sensitivity and, furthermore, such known structured hot wire relay type devices do not have dimensional stability in the repeated performance of their control or work functions in response to internal or external heat applications.

SUMMARY OF THE INVENTION

The present invention relies upon an alloy composition exhibiting the unusual characteristic of temperature actuated mechanical shape memory as the result of martensitic-type transformation. An example of such alloy composition is a nickel-titanium alloy which has many advantages over bimetallic composites, one being that it produces more useful work per unit weight of metal. Such nickel-titanium alloy preferably has 50 to 70 percent nickel by weight and from about 50 to 30 per cent titanium by weight with the alloy having the structure of a TiNi phase in combination with a $TiNi_3$ phase despersed in a TiNi matrix within a temperature range of about 500° C. to about − 75° C.

While the foregoing specifically defined nickel-titanium alloy has been found to be of inestimable value in the present invention because it exhibits the unusual characteristic of possessing a mechanical memory, the present invention finds its value in utilizing other materials with a mechanical shape memory even though they may not be of such particularly delineated nickle-titanium composition.

An important aspect of the materials employed resides in the unusual characteristic of shape or mechanical memory. By this is meant that a straight wire of a material can be bent or contorted below its martensitic transition temperature and it will retain its formed shape, but when the deformed wire is heated above its transition temperature with nothing constraining its free movement, such wire will immediately spring back to its original straight shape.

An engineering description of such material in its transition is that it has a curve of increasing modulus with increasing temperature and another curve of decreasing modulus with decreasing temperature. This description applies to either modulus of Elasticity or to Modulus in Torsion.

In general, such material is used in a complete cycle, that is, the control or work mechanism applies a load to the memory material that will cause the material to deform when it is cold and, to complete the cycle, heat is applled from a medium being controlled or supplied from a power source to cause the material to perform work. The supplied heat causes the material to try to return to the annealed shape it had before it was deformed. The mechanisms for applying load and heat to the material should be such that they allow the material to go through complete cycles with an excess of work available for control or work functions, with no loss of dimensional stability.

To make a practical application using the hot strength of such wire, the wire must be heated uniformly to prevent overstressing the sections which remain below the transition temperature. If the wire is clamped at the ends by conventional means the ends remain cooler and, therefore, soft, but the center portion of the wire heats above the transition temperature and becomes hard with a higher modulus of elasticity. The maximum allowable stress than can be used is, therefore, the allowable stress of the soft, cool ends of the wire unless some way can be found to harden the ends independent of temperature or allow the ends to heat at the same rate as the center of the wire.

Accordingly, an object of the present invention is to provide methods of maintaining or producing a uniformly hard wire when the wire is heated above its transition temperature by means such as an electrical current.

Another object of the present invention, inasmuch as the wire is prone to encounter temperatures along the length thereof differing from those at the supported ends, is to apply various termination methods to the ends whereby a more reliable and stronger end anchoring is produced with the ends being hardened so that they have no transition or have a transition differing from the transition temperature of the active center portion intermediate such end portion.

Another object of the present invention is to provide a method for thermally distributing heat in a hot wire relay to achieve thermal balance throughout the wire body.

This invention has a further object in the method of forming a hot wire in such a manner as to highly stress sections of the hot wire, which are readily heated to above the transition temperature but to reduce the stress in sections which are slow to heat and thereby stay soft and below the transition temperature.

DESCRIPTION OF THE PREFERRED EMBODIMENTS

Figure 1:
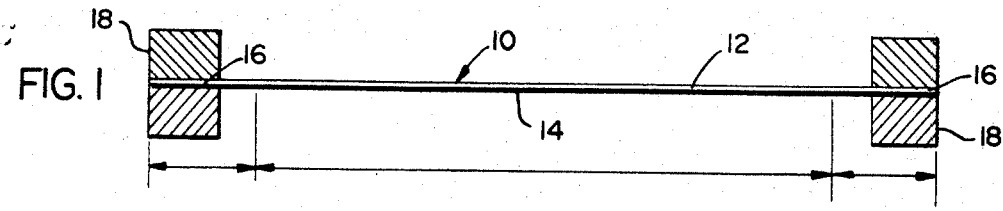
FIG. 1 is a side elevational view of a wire clamped at its ends by conventional means, with such clamping means being shown in vertical section, and the thermal balance being achieved by annealing supported or anchored ends of the wire so that they remain hard at all times in relation to the uniformly heated center section wherein a modulus change is to be obtained.

Referring now more particularly to the accompanying drawing and, initially to FIG. 1, the hot wire relay type device 10 is composed of a wire body 12 formed from an alloy composition as specified or from any composition that exhibits the characteristic of temperature actuated mechanical shape memory as a result of martensitic-type transformation. In its transition such wire body has a curve of increasing modulus with increasing temperature and another curve of decreasing modulus with decreasing temperature. This description applies to either Modulus of Elasticity or to Modulus in Torsion. The wire body is stretched when it is cool and soft below its transition temperature and a current is then passed through the wire body or an external heat source is applied to heat the wire body above its transition temperature. The wire body, which becomes much stronger as its temperature rises, overcomes the force tending to stretch it and returns toward its original unstretched length. The alternate stretching and contracting of the wire body can be utilized by well known conventional means, not shown, to operate a switch, valve, motor or other mechanical device.

In the embodiment of FIG. 1, the wire body 12 is work hardened and the main center section 14 of the wire is annealed so as to obtain a modulus change only in the uniformly heated center section 14. The end portions 16, which are anchored in the clamps 18, remain hard at all times and can be reliably clamped in the clamps 18. The center section 14 of the wire body 12 may be heated to annealing temperature by any convenient means such as applying current through the wire or applying external heat thereto.

Figure 2:
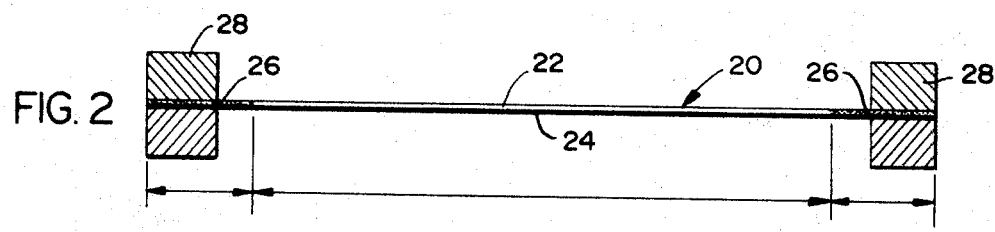
FIG. 2 is a side elevational view of another embodiment according to the present invention wherein the clamped ends of the wire are hardened by a separate process, such as chromium infusion.

In FIG. 2, the hot wire relay-type device 20 is composed of a wire 22 formed of an alloy composition having the same unusual characteristic of temperature actuated shape or mechanical memory as the wire body 12 (FIG. 1). The wire body 22 has a main center section 24 terminating in end portions 26 which are treated so as to produce hardening by a separate process, such as chromium infusion, with the treated and resultingly hardened end portions 26 being clamped in the holding clamps 28.

Figure 3:
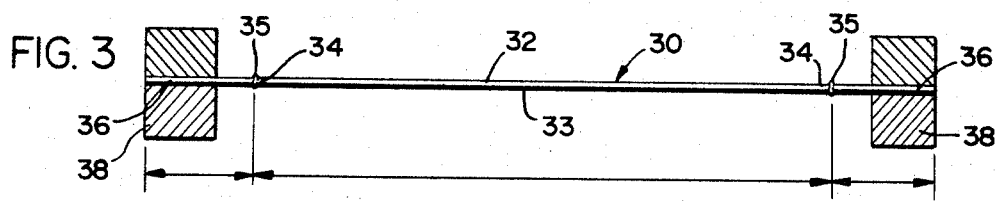
FIG. 3 is a side elevational view of another form of terminating arrangement for the wire according to the present invention wherein the supporting ends are formed from a hard material which has no transition within the expected temperature range and which supporting ends are welded to the ends of the wire in advance of clamping with the conventional supporting clamps, which are shown in vertical section.

In FIG. 3, the hot wire relay type device 30 is composed of wire body 32 having an elongated portion 33 formed entirely of an alloy composition having the characteristics of temperature actuated shape or mechanical memory as a result of martensitic-type transformation. The portion 33 is annealed and has its ends 34 welded, as at 35, to hard wire end portions 36 which end portions have no transition in the expected temperature range. The end portions 36 are anchored by means of conventional clamps 38. The portion 33 thus forms the active central portion of the overall wire including the welded-on end portions 36.

Figure 4:
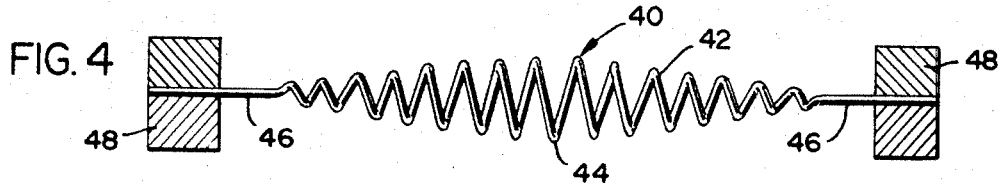
FIG. 4 is a side elevational view of still another embodiment of the present invention wherein although thermal balance is not achieved along the length of the body, the stress is reduced, by virtue of smaller diameter loops at the ends, to a low enough stress level to allow the soft wire to be easily supported by clamps, which are shown in vertical section.

In FIG. 4, the hot wire relay type device 40 is composed of a single length of wire 42 formed from an alloy composition of any type that exhibits the unusual characteristics of temperature actuated mechanical or shape memory, as afore-defined, with the wire body having a helically coiled center portion 44. The helical coil configuration is constituted by outwardly diminishing diameter loops and at its ends with the outermost loops terminating in straight axial projections 46 that are held within clamps 48. The stress reduces as the mean diameter decreases with a low stress on the end portions 46 so that even though the ends heat slowly and remain below the transition temperature and thereby soft, the low stress required for proper operation of the device will not yield or become unstable in the clamp area. In this manner, thermal balance is achieved throughout the wire body 42 including the ends 46 thereof.

Figure 5:
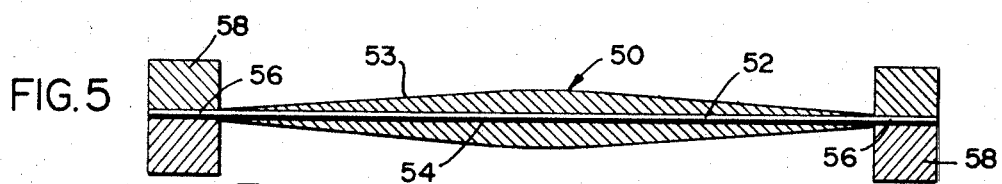
FIG. 5 is a side elevational view of still another form of the present invention wherein thermal balancing of the wire body is achieved by adding a mass to the center of the wire body so as to achieve slow heating in the portion of the wire body intermediate the ends thereof until the clamped ends are heated above the transition point, with such ends being held by clamps, which are shown in vertical section.

In FIG. 5, the hot wire relay type device 50 is composed of a wire body 53 formed of an alloy composition exhibiting the unusual characteristic of temperature actuated shape or mechanical memory of the nature as defined in connection with the preceding embodiments. The wire body 52 has a coating 53 that tapers from the center toward the opposing ends for the purpose of retarding heating of the center section 54 of the wire, the entire wire being annealed. The uncoated end portions 56 are anchored in the clamps 50. The coating 53 has a greater thickness at the middle or center of the wire than at the ends and the end portions 56 are free from any coating so that in this way the entire length of the wire will have an excellent thermally distributive heat characteristic.

Figure 6:
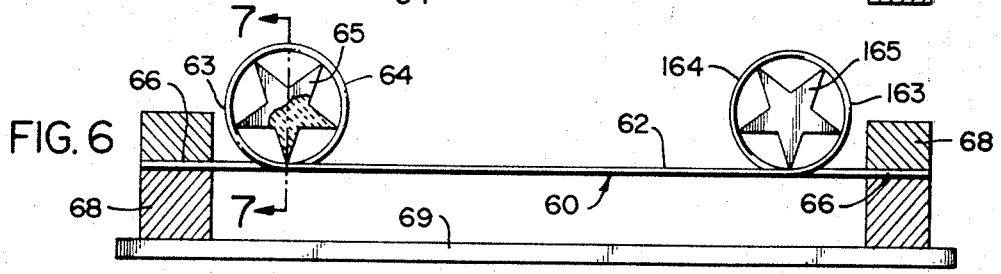
FIG. 6 is a side elevational view of another embodiment of the present invention wherein the teminal end sections of the wire are each wrapped around a low mass heat insulator with the turns being close together in order to induce self-heating at the ends that are supported by the heat insulation and by clamps, which are shown in vertical section.
Figure 7:
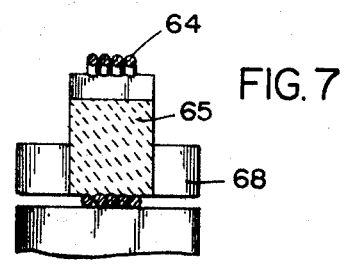
FIG. 7 is a detailed cross-sectional view, taken substantially on line 7—7 of FIG. 6.

In FIGS. 6 and 7, the hot wire relay type device 60 is composed of a wire body 62 formed from an alloy exhibiting the unusual characteristic of temperature actuated mechanical or shape memory as a result of martensitic-type transformation, as afore delineated. Each terminal section 63 (163) is wrapped in a number of side-by-side turns 64 (164) around a relatively large diameter, star-shaped or pointed low mass heat insulator 65 (165) with the turns 64 (164) being close together, as shown in FIG. 7, so as to induce self-heating in each terminal section 63 (163), that is wrapped around its star-shaped insulator 65 (165). Each end portion 66 (166) of wire 62 is held by a clamp 68 (168). The star-shaoed insulators 65 and 165 act as capstans, and the clamps 68 and 168, which are mounted on the same supporting base 69, prevent the terminal sections 63 and 163 from slipping on the star-shaped insulators 65 and 165.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. A method for thermally balancing heat reactive controllers for actuators of the type used in hot wire relays and the like in which the controller is formed by an elongated wire having a center reactive portion terminating in a pair of spaced opposite end portions, said wire being formed from an alloy having temperature actuated mechanical shape memory as a result of martensitic-type transition and having an initial shape above a predetermined transition temperature and a destorted shape below said predetermined temperature, and a pair of spaced clamping means secured to said end portions holding said wire in said distorted shape under mechanical load below said predetermined transition temperature,
   wherein the improvement comprises the step of modifying the thermal characteristics of one of said center portion and said end portions with respect to the other of said portions in order to compensate for normal heat loss at said end portions caused by transfer of heat from said wire to said clamping means whereby heating of said wire to at least transition temperature causes said wire to heat in a substantially uniform manner throughout its entire length and tend to resume its intitial shape with substantially uniform hardness.

2. The method according to claim 1 wherein said step of modification comprises annealing said center portion to obtain a modulus of elasticity change in only said center portion for a change in temperature, the end portions anchored by the clamping means remaining hard throughout the change in temperature.

3. The method according to claim 1 wherein said step of modification comprises annealing said center portion to obtain a modulus in torsion change in only said center portion for a change in temperature, the end portions anchored by the clamping means remaining hard throughout the change in temperature.

4. The method according to claim 1 wherein said step of modification comprises prehardening said end portions independent of temperature to have a hardness greater than that of said center portion below said transition temperature whereby the hardness of said end portions is substantially unaffected by said transition temperature.

5. The method according to claim 1 wherein said step of modification comprises forming said end portions from hard wire segments having substantially no change in hardness at said transition temperature, and welding said segments to the wire forming the center portion.

6. The method according to claim 1 wherein said step of modification comprises forming said center portion as a helical coil with outwardly diminishing diameter coils with the outermost coils terminating in straight axial projections forming said end portions, whereby stress on the end portions is reduced.

7. The method according to claim 1 wherein said step of modification comprises forming a coating on said center portion, said coating being of greater thickness at the middle of said wire and tapering in thickness toward the ends, whereby heating of said center portion is retarded with respect to said end portions to achieve thermal balance.

8. The method according to claim 1 wherein said step of modification comprise wrapping turns of said wire about a pair of large diameter, low mass heat insulators spaced from each other on opposite ends of the center portions, said turns being close together so as to induce self-heating at the end portions and thereby provide thermal balance in said controller.

9. A method for thermally balancing heat reactive controllers formed by an elongated wire of an alloy having temperature actuated mechanical shape memory as a result of martensitic-type transition and having a center reactive portion terminating in a pair of spaced opposite end portions, said center reactive portion having an initial shape above a predetermined transition temperature and a distorted shape below said predetermined temperature,
   said method comprising the step of modifying the thermal characteristics of one of said center portion and said end portions with respect to the other of said portions, and
   securing said end portions in spaced clamping means to hold said wire under load in said distorted shape whereby thermal losses from said end portions to said clamping means are compensated for so that heating of said wire to at least said transition temperature causes said wire to substantially uniformly heat throughout its entire length and to resume its initial shape with substantially uniform hardness.

10. A method for heating an elongated wire of martensitic material normally held under load in a distorted configuration by a pair of spaced clamping means secured to opposite end portions forming terminals of a central reactive portion of said wire,
    said method comprising the step of modifying the thermal characteristics of either a center portion or the end portions of said wire to compensate for normal thermal losses from said end portions to said clamping means so that heating of said wire to at least said transition temperature causes said wire to substantially uniformly heat throughout it entire length and to resume its initial undistorted shape with substantially uniform hardness.

* * * * *